(12) United States Patent
Yang et al.

(10) Patent No.: US 8,705,494 B2
(45) Date of Patent: Apr. 22, 2014

(54) WIMAX SCHEDULING ALGORITHM FOR CO-LOCATED WIFI AND WIMAX CENTRAL POINTS

(75) Inventors: Lei Yang, Goleta, CA (US); Xue Yang, Arcadia, CA (US); Hsin-Yuo Liu, San Jose, CA (US); Jing Zhu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 959 days.

(21) Appl. No.: 12/633,053

(22) Filed: Dec. 8, 2009

(65) Prior Publication Data

US 2011/0134891 A1    Jun. 9, 2011

(51) Int. Cl.
  *H04J 3/00*    (2006.01)
(52) U.S. Cl.
  USPC ............ 370/336; 370/338; 370/345; 370/347
(58) Field of Classification Search
  USPC .................................. 370/336, 338, 345, 347
  See application file for complete search history.

(56) References Cited

U.S. PATENT DOCUMENTS

| | | | | |
|---|---|---|---|---|
| 2006/0256747 A1* | 11/2006 | Jaakkola | ...................... | 370/328 |
| 2009/0245216 A1* | 10/2009 | Banerjea et al. | ............. | 370/338 |
| 2009/0312010 A1* | 12/2009 | Hall | ........................... | 455/426.1 |
| 2010/0056136 A1* | 3/2010 | Zhu | ............................. | 455/426.1 |
| 2010/0144340 A1* | 6/2010 | Sudak | ....................... | 455/426.1 |

FOREIGN PATENT DOCUMENTS

| | | | |
|---|---|---|---|
| WO | 2008/078311 | | 7/2008 |
| WO | WO2008078211 | * | 7/2008 |
| WO | 2009/107968 | | 9/2009 |
| WO | 2009/108183 | | 9/2009 |
| WO | 2009/111406 | | 9/2009 |
| WO | WO 2009108183 | * | 9/2009 |
| WO | 2010/030938 | | 3/2010 |
| WO | WO2010030938 | * | 3/2010 |

OTHER PUBLICATIONS

Coexistence Mechanism using dynamic fragmentation for interference mitigation between wifi and Bluetooth by Hsu, 2006.*
"Survey of MAC based Qos implementations for Wimax network" by Yegin.*
British Patent Office, Combined Search and Examination Report issued in corresponding GB Application No. GB1020720.7, dated Apr. 13, 2011, 7 pgs.

* cited by examiner

*Primary Examiner* — Dang T Ton
*Assistant Examiner* — Pamit Kaur
(74) *Attorney, Agent, or Firm* — Trop, Pruner & Hu, P.C.

(57) ABSTRACT

After receiving an indication that a co-located central point is receiving co-location interference, a scheduling algorithm may be initiated. The scheduling may include allocating equal number of central points within each WiMAX frame. Each central point is allocated into a minimum number of frames subject to WiMAX capacity constraints.

16 Claims, 3 Drawing Sheets

WIMAX SCHEDULING ALGORITHM FOR CO-LOCATED WIFI AND WIMAX CENTRAL POINTS

BACKGROUND

This relates to networks that use both WiMAX and WiFi communication through central points.

In some networks, the base station may communicate via Worldwide Interoperability for Microwave Access (WiMAX) (IEEE Std. 802.16-2004, IEEE Standard for Local and Metropolitan Area Networks, Part 16: Air Interface for Fixed Broadband Wireless Access Systems IEEE New York, N.Y. 10016) with a central point which, in turn, communicates with a personal area network via WiFi (IEEE Std. 802.11 (1999 Jul. 15) Wireless LAN Medium Access Control (MAC) and Physical Layer Specifications). The central point may then be said be a co-located WiFi and WiMAX transceiver.

WiFi and WiMAX combination radios provide wireless, wide area network (WWAN) access via WiMAX and wireless personal area network (WPAN) service via WiFi at the same time. A WiMAX base station provides WiMAX access to multiple personal area network cells. Within each such cell, a multi-radio platform with co-located WiFi and WiMAX radio serves as the central point that can communicate externally of the personal area network using WiMAX, while also acting as the access point for personal area network clients.

Due to strong co-located radio interference and resource constraints, co-located WiMAX and WiFi radios cannot operate at the same time. The WiFi radio usually has to yield to the WiMAX radio. The coordination of operations between WiFi and WiMAX can be performed, for example, through a MAC coordinator, where the resource is arbitrated between co-located radios and co-located radios effectively operate in a time division multiplexed fashion.

In general, scheduled WiMAX activities are given a higher priority than WiFi activities, so that WiFi can only operate when WiMAX is not in conflicting operations. At the same time, personal area network central points compete with each other for common channel access over WiFi. As a result, the different ways of scheduling WiMAX activities among the central points leads to different levels of WiFi channel contention among the central points. Consequently, scheduling of WiMAX network traffic affects the overall throughput of the coexisting personal area networks. Generally, existing WiMAX scheduling algorithms allocate solely based on WiMAX performance criteria. Without considering coexisting conditions, these schedules may produce WiMAX scheduling patterns that lead to devastating personal area network throughput.

DETAILED DESCRIPTION

Time division multiplexing may be used between co-located WiFi and WiMAX radios at the WiMAX frame level. If there is no scheduled WiMAX activity within one frame, then the co-located WiFi radio is able to use that frame duration for WiFi operations. The aim, in some embodiments, is to achieve maximal aggregate WiFi throughput while preserving quality of service for WiMAX traffic defined by delay and bandwidth requirements.

Since the WiFi radio needs to yield to the WiMAX radio, the WiMAX scheduling actually controls the availability of personal area network cells over time. The aggregated personal area network throughput may be modeled as a function of the number of active personal area network cells with analysis of the coexistence aware scheduling optimization.

Each central point may be scheduled in a minimum number of frames possible for WiMAX traffic, so that the WiFi radios get more time to operate. This means the WiMAX traffic is handled in the smallest feasible number of frames. The scheduling of multiple central points may be evenly distributed in time over WiMAX frames, given the delay and bandwidth requirements of the WiMAX traffic. In essence, by distributing WiMAX activities of multiple central points across different frames, multi-user diversity can be exploited to enable the WiFi network to be load balanced and maintain network efficiency.

The WiMAX arrival time may be, for example, every second frame, so there is no need to schedule every client in every frame. It is better to evenly distribute central points across frames.

Figure 1:
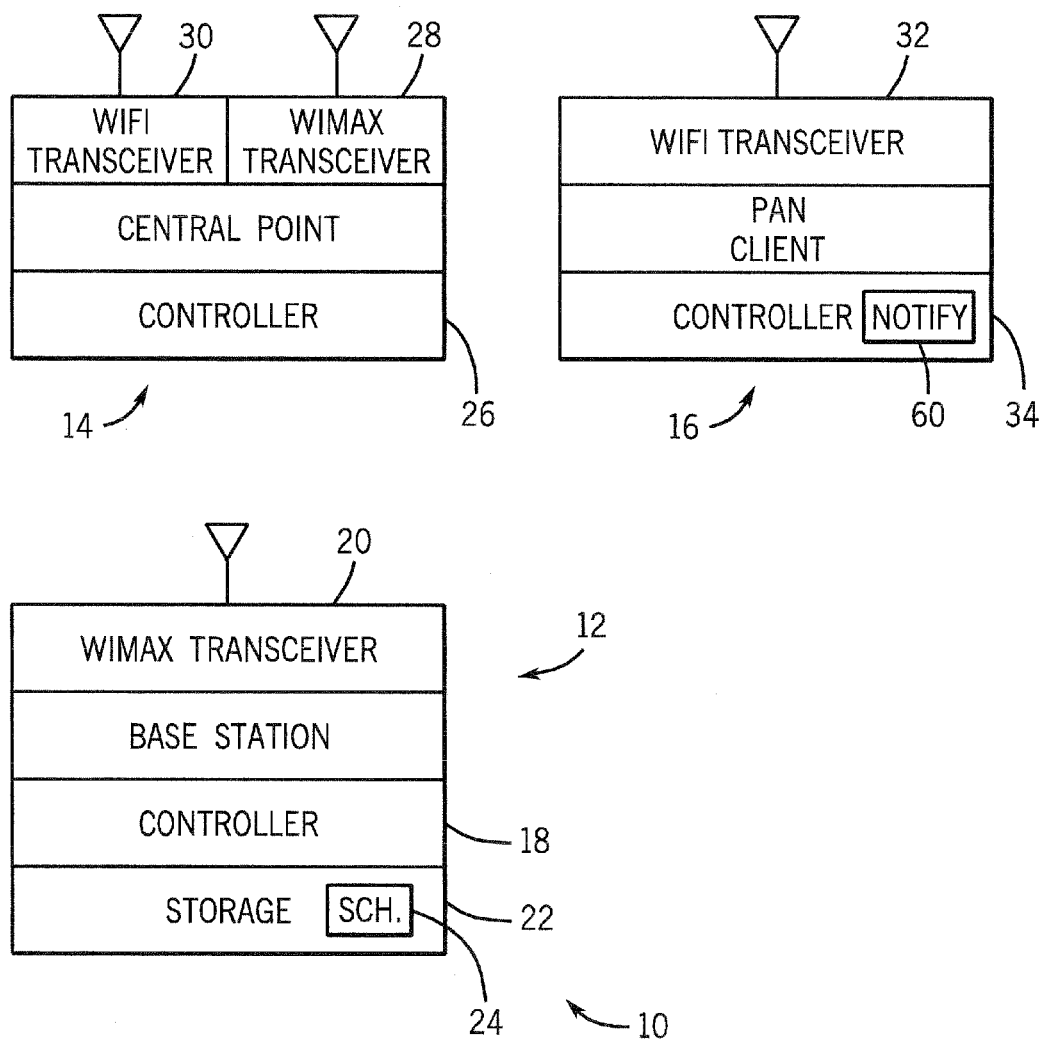
FIG. 1 is a schematic depiction of a network in accordance with one embodiment that operates both in WiMAX and WiFi.

Referring to FIG. 1, the wireless network 10 may include a base station 12 with a WiMAX transceiver 20. The base station also includes a controller 18 that controls the operation of the base station, including the transceiver 20. The controller uses a storage 22, which is a computer readable medium storing instructions that may be executed by the controller 18. The storage may store a scheduling algorithm 24 in one embodiment.

The base station 12 communicates with a central point 14, which also includes a controller 26. However, the central point 14 includes a WiMAX transceiver 28 for communicating with the base station 12 and a WiFi transceiver 30 for communicating with personal area network (PAN) clients 16. Personal area network clients 16 include WiFi transceivers 32 and controllers 34.

The base station 12 knows whether a WiMAX client is located on a multi-radio central point or not, as explained hereinafter. With that knowledge, the base station 12 allocates equal numbers of central points within each frame and tries to allocate each central point into the minimum number of frames, subject to WiMAX capacity constraints.

The maximum allowable delay of WiMAX traffic at central point i at the current time, Di, and the total number of central points, N, may be determined. The delay bound indicates a deadline with which a packet is scheduled for handling required by application (because, beyond that deadline, the packet is no longer useful). The central point with the shortest deadline is scheduled first and so on. Also, sufficient bandwidth is scheduled to meet a client's deadline.

The average maximum delay requirement $\overline{D}$, equal to $N/\Sigma_{i=1}^{N} 1/D_i$, is based on the current maximum delay requirements of all central points. A scheduling history of M frames is maintained, where M is much greater than 1. M, in some embodiments, may be the least common multiplier for delay requirements of all central points:

$$M = \text{lcm}(D_i|_{i=1,\ldots,N}).$$

For the $k_{th}$ frame, within the scheduling history M, the average delay requirement is $\overline{D}_k$. The number of central points actually scheduled in the $k^{th}$ frame is $n_{A,k}$. $D_i$ and N may change over time, so $\overline{D}$ could be different in different frames.

A task list L is maintained to store the pending WiMAX scheduling tasks, sorted by their deadlines. The list L is updated when a new bandwidth request arrives.

The ideal expected number of central points $n_{E,k}$ that can be scheduled in the $k_{th}$ frame may be such that the total number of central points scheduled in previous total k frames is equal to the ceiling of $(\Sigma_{j=1}^{k}(N/\overline{D_j}))$, where $\overline{D_j}$ is the average delay requirement for the $j^{th}$ frame.

Then, the expected number of central points that can be scheduled in frame k in the actual case is:

$$n_{E,k} = \text{ceiling}(N/\overline{D_k} + \Sigma_{j=1}^{k-1}(N/\overline{D_j} - n_{A,j})),$$

where $n_{A,j}$ is the actual number of central points scheduled in the $j^{th}$ frame from the history. The first term is the ideal number central points that should be scheduled for the $k_{th}$ frame and the second term is the number of leftover central points that should have been scheduled already but were not accommodated.

This difference is accumulated from frame to frame, while always trying to get back to the ideal. This may be accomplished by trying to handle the average number of central points, plus the accumulated central points, that should have been handled in the preceding k−1 flows but were not handled.

The central points actually scheduled in $k^{th}$ frame may be selected from the sorted task list L with the nearest deadline first, subject to the capacity constraint and is bounded by $n_{E,k}$. The actual number of central points scheduled is recorded as $n_{A,k}$, with $n_{A,k}$ being less than or equal to $n_{E,k}$.

Within a frame scheduled by a base station, the amount of bandwidth devoted to any client depends on the nature of the client's needs. So the N central points may all get a time within a certain number of frames, but the scheduled bandwidth may be different. Bandwidth is the amount of allocated time times the frequency allocation.

Figure 2:
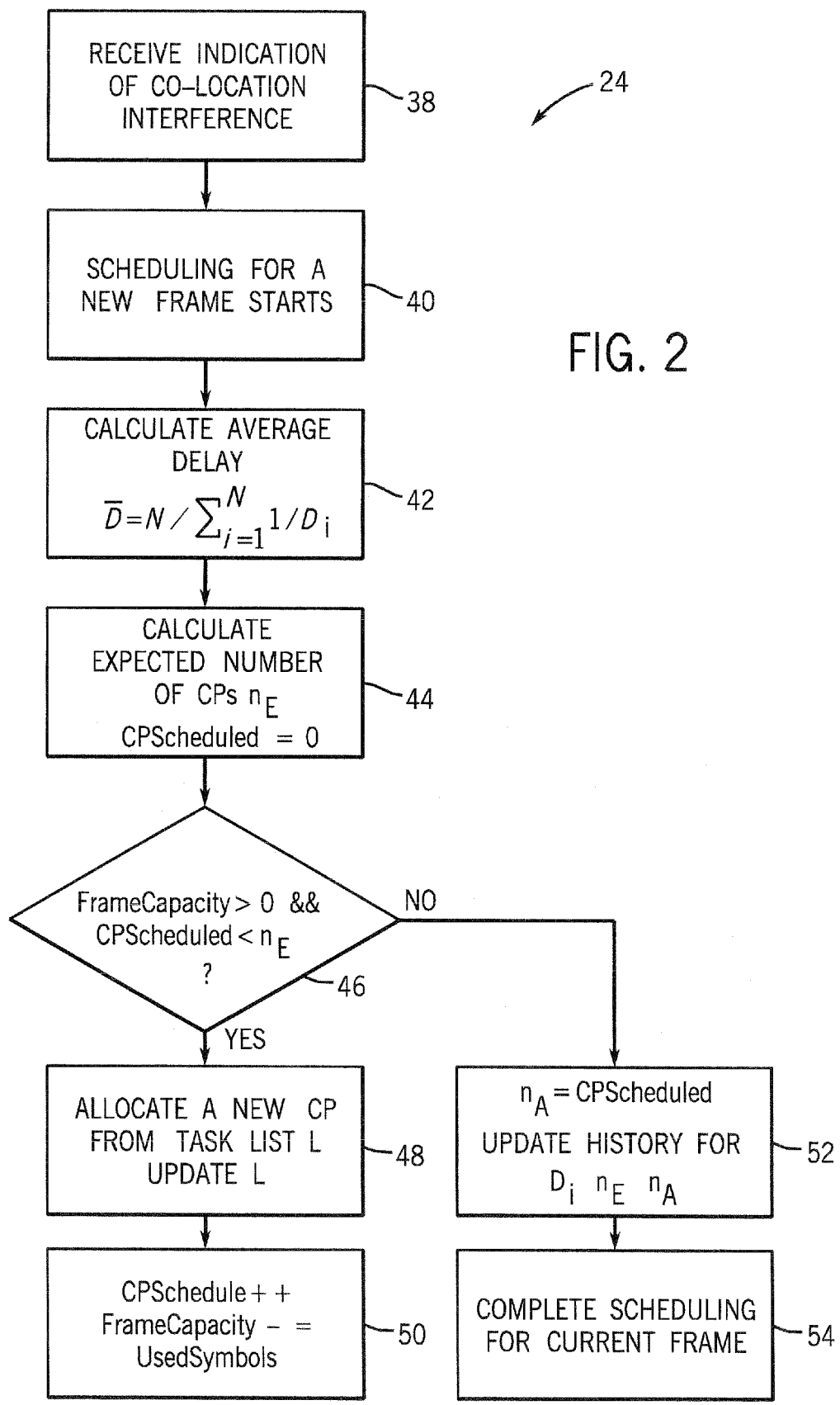
FIG. 2 is a flow chart for a base station in the embodiment shown in FIG. 1.

Referring to FIG. 2, in some embodiments, the sequence 24 may be implemented in hardware, software, or firmware. In a software embodiment, the sequence may be implemented in instructions executable by the controller 18. Those instructions may be stored on a computer readable medium in the form of a storage 22, which may be an optical, magnetic, or semiconductor memory.

Initially, a base station receives an indication in block 38 that a central point is experiencing co-location interference. The scheduling for new frames starts at block 40. The average delay $\overline{D}$ is calculated, as indicated in block 42. Then the expected number of central points is calculated in block 44. The CPscheduled variable, indicating the number of central points scheduled, is initially set equal to zero in some embodiments.

At diamond 46, a check determines whether the frame capacity is greater than zero and the CPscheduled variable is less than the expected number of central points $n_E$ in one embodiment. If so, a new central point is allocated from the task list L and the task list L is updated, as indicated in block 48. Then the CPscheduled variable plus the frame capacity variable may be set equal to the number of symbols used (block 50).

If the frame capacity is not greater than zero or the CPscheduled variable is not less than $n_E$ (diamond 46), then $n_A$ is set equal to the CPscheduled variable in one embodiment. The history is updated for D, $n_E$, and $n_A$, as indicated in block 52. Then the scheduling is completed for the current frame, as indicated in block 54.

The interference from heterogeneous coexisting networks and/or radios typically presents different characteristics than co-channel interference. Heterogeneous interference is caused by emission of a different radio following a different protocol in an adjacent/overlapping spectrum, and is device-dependent and location-dependent. Heterogeneous interference often presents an on/off pattern relative to the operations of the interfering radio.

Figure 3:
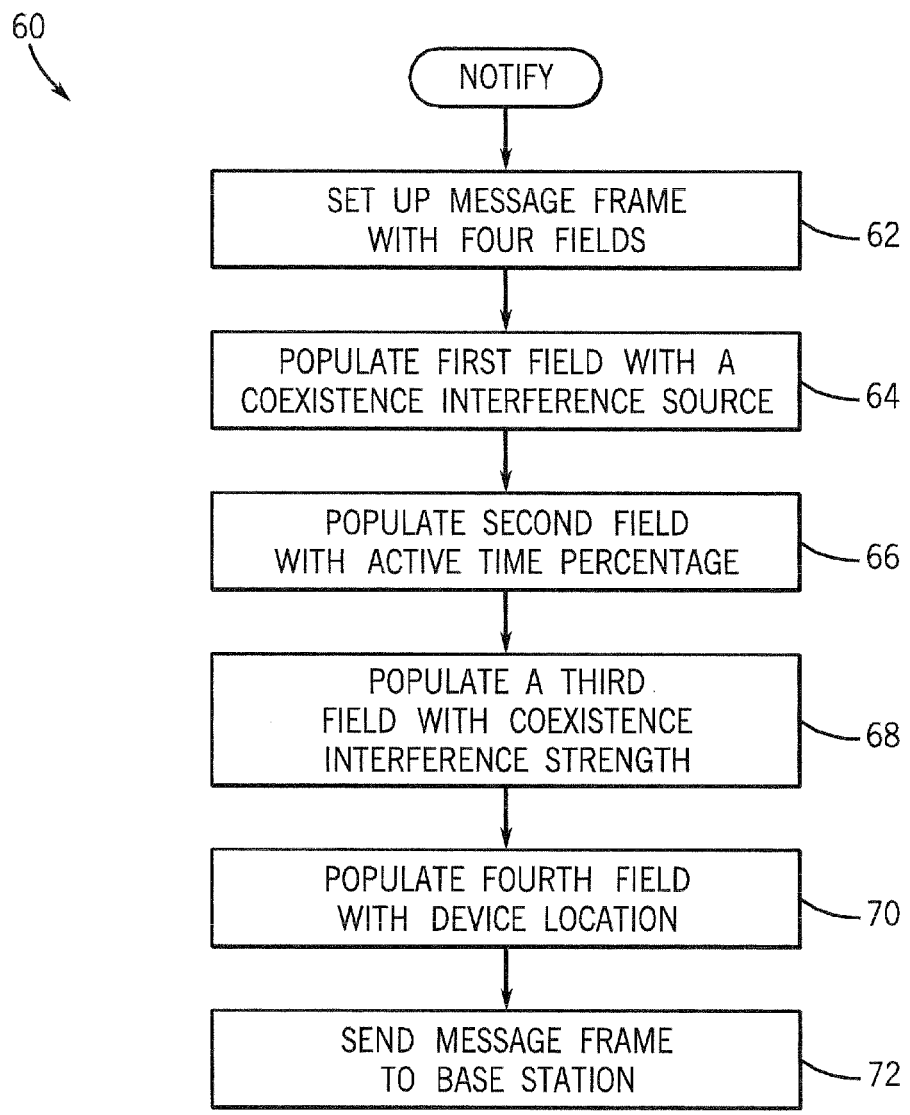
FIG. 3 is a flow chart for a mobile station in the embodiment shown in FIG. 1.

Four core informational elements may be used for coexistence related optimization in some embodiments. A corresponding signaling mechanism may be used so that the subscriber can send those informational elements to the base station. Referring to FIG. 3, one way is to define a message frame (block 62) that includes a first field with the coexistence interference source, a second field with the active time percentage, a third field with a coexistence interference strength, and a fourth field with the device location. The coexistence interference source in field one specifies the type of interference source (block 64). Three cases may be differentiated. The first case is that there is no coexisting radio interference. The second case is where there exists coexistence interference and explicit coordination between the WiMAX subscriber and the coexistence interference source is not available. The third case is where there exists coexistence interference and explicit coordination between the WiMAX subscriber and the coexistence interference source is available.

Field number one enables the base station to be aware that the subscriber is subject to coexistence interference and the base station can handle the subscriber as described in FIG. 2.

Field number two (block 66) is used to specify the average percentage of time when the coexistence interference is active. The coexistence interference may be on and off and the exact on and off pattern may not be known to the WiMAX subscriber being affected. The active time percentage is feasible to maintain and provides the base station with a coarse level of timing information regarding the coexistence interference, while presenting minimal overhead. The base station can use this information to optimize the scheduling and other related function modules to counter coexistence interference.

The third field (block 68) is used to specify the average strength of in-band coexistence interference when the interference is active. In the case of a co-located radio, the WiMAX subscriber may suffer from front end saturation. This field can be used by the subscriber to indicate the presence of front end saturation to the base station. In general, when coexistence interference is active, it is the dominant factor that affects the subscriber. On the other hand, when coexistence interference is off, the subscriber is generally impacted by random channel variation and co-channel interference. The coexistence interference provides the base station with the knowledge about the relative strength of coexistence interference. Given the on and off nature of heterogeneous interference, such information is complementary to the channel quality indicator (CQI) feedback information. Fields two and three, together can be particularly useful for link optimization and power control function modules at the base station to optimize performance.

The fourth field (block 70) is used to specify the physical location of the subscriber. Heterogeneous coexistence interference is location dependent. Knowing the location of the devices, the base station can combine interference reports from subscribers close to each other to obtain a clearer picture about the coexistence interference. Additionally, WiMAX's impact on coexisting networks is also location dependent. Device location information can help the base station to determine the constraints across multiple subscribers.

After populating the four fields, as indicated in blocks 64, 66, 68, and 70, the message may then be formulated and sent to the base station, as indicated in block 72. In some embodiments, the sequence 60 may be implemented in software, hardware, or firmware. In a software embodiment, it may be implemented by instructions stored in a computer readable medium. In one embodiment, the computer readable medium may be part of the controller 34, as indicated at 60, in FIG. 1. In other embodiments, a separate storage may be utilized. The controller 34, in some embodiments, may execute the instructions stored in a computer readable medium.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving, in a base station, a message from a mobile station;
automatically determining in the base station if a central point has a co-located radio;
allocating frames in said base station based on information about whether the central point has a co-located radio;
calculating an average delay requirement based on maximum delay requirements of all central points; and
calculating a number of central points to be scheduled within a particular frame such that the total number of central points scheduled in previous frames and the current frame is equal to the ceiling of the summation of the number of central points from the previous and current frames divided by the average delay.

2. The method of claim 1 further including:
receiving an indication from a central point that the central point, having a WiMAX and a WiFi transceiver, is experiencing coexistence interference; and
allocating the central point into a minimum number of frames subject to WiMAX capacity constraints.

3. The method of claim 2 including maintaining a scheduling history M of frames and setting M as the least common multiplier for the delay requirements.

4. The method of claim 3 determining for each frame, the average delay requirement and the number of central points actually scheduled in that frame.

5. The method of claim 4 including maintaining a task list to store the pending WiMAX scheduled tasks sorted by their deadlines.

6. The method of claim 5 including scheduling central points from the sorted task list with the nearest deadline first, subject to capacity constraints and bounded by the ceiling of the number of central points divided by the average delay for the current frame plus the summation from the previous frames of the number of central points divided by their average delay minus the number of central points actually scheduled in the previous frames.

7. The method of claim 6 including allocating a new central point from the task list if the frame capacity is greater than zero and the number of central points scheduled is less than nE.

8. The method of claim 7 including, if the number of central points scheduled is not less than the expected number of scheduled central points, then setting the actual number of central points scheduled equal to the expected scheduled number of central points.

9. A non-transitory computer readable medium storing instructions executed by a processor to:
receive an indication from a central point that the central point, having a WiMAX and WiFi transceiver, is experiencing coexistence interference;
allocate the central point into a minimum number of frames subject to WiMAX capacity constraints;
calculate an average delay requirement based on maximum delay requirements of all central points; and
calculate a number of central points to be scheduled within a particular frame, such that the total number of central points scheduled in previous frames and the current frame is equal to the ceiling of the summation of the number of central points from the previous and current frames divided by the average delay.

10. The medium of claim 9 further storing instructions to maintain a scheduling history M of frames and setting M as the least common multiplier for the delay requirements.

11. The medium of claim 10 further storing instructions to determine, for each frame, the average delay requirement and the number of central points actually scheduled in that frame.

12. A central point comprising:
a WiMAX and WiFi transceiver;
a controller coupled to said transceiver;
a storage coupled to said controller, said storage to store instructions to automatically determine if the central point has a co-located radio;
calculate an average delay requirement based on maximum delay requirements of all central points; and
calculate a number of central points to be scheduled within a particular frame, such that the total number of central points scheduled in previous frames and the current frame is equal to the ceiling of the summation of the number of central points from the previous and current frames divided by the average delay.

13. The central point of claim 12, said central point to set up a message frame with fields, including a field populated with a coexistence interference source.

14. The central point of claim 13, said central point to populate a second field with an active time percentage.

15. The central point of claim 13, said central point to populate a third field with coexistence interference strengths.

16. The central point of claim 13, said central point to set up a message frame populated with the device location, said central point to compose a message and to send said message to a base station to indicate that the central point is experiencing co-existence interference.

* * * * *